United States Patent [19]

Martin

[11] 4,362,569

[45] Dec. 7, 1982

[54] SULFIDED CARBONACEOUS MATERIALS AND VULCANIZED AND VULCANIZABLE RUBBER COMPOSITIONS REINFORCED WITH SUCH CARBONACEOUS MATERIALS

[75] Inventor: Jon W. Martin, Los Alamitos, Calif.

[73] Assignee: TRW Inc., Redondo Beach, Calif.

[21] Appl. No.: 278,275

[22] Filed: Jun. 29, 1981

[51] Int. Cl.$^3$ .............................................. C09C 1/44
[52] U.S. Cl. ..................................... 106/307; 523/215
[58] Field of Search ................ 106/304, 307; 423/459, 423/460; 523/215

[56] References Cited

U.S. PATENT DOCUMENTS 3,408,164 10/1968 Johnson ............................. 423/460
3,433,660 3/1969 Jordan et al. ....................... 423/460

Primary Examiner—James Poer
Attorney, Agent, or Firm—Donald R. Nyhagen; Robert W. Keller

[57] ABSTRACT

Sulfided carbonaceous materials suitable for reinforcing such diene rubbers as styrene-butadiene rubber and natural rubber include carbon, sulfided iron dispersed in, intimately associated with and at least partially bonded to the carbon, and hydrogen.

11 Claims, No Drawings

SULFIDED CARBONACEOUS MATERIALS AND VULCANIZED AND VULCANIZABLE RUBBER COMPOSITIONS REINFORCED WITH SUCH CARBONACEOUS MATERIALS

This invention relates to new sulfided carbonaceous materials that include carbon, iron dispersed in, intimately associated with and at least partially bonded to the carbon, sulfur and hydrogen; to new compositions comprising a mixture of sulfur-curable, rubbery polymers and such sulfided carbonaceous materials; and to vulcanized and vulcanizable compositions that include such mixtures.

The new sulfided carbonaceous materials include carbon in an amount in the range of about 80% to about 99% by weight, preferably about 90% to about 94% by weight; sulfided iron dispersed in, intimately associated with and at least partially bonded to the carbon in an amount in the range of about 1% to about 15% by weight, preferably about 3% to about 9% by weight; and hydrogen in an amount in the range of about 0.1% to about 1.5% by weight, preferably about 0.5% to about 0.8% by weight.

We make our new carbonaceous materials by depositing carbon from a carbon monoxide/hydrogen gas mixture on an iron-based initiator at a temperature in the range of about 300° C. to about 700° C., and at a pressure in the range of about one to about 100 atmospheres or more. Copending U.S. patent application Ser. No. 99,789, filed Dec. 3, 1979, in the U.S. Patent and Trademark Office, and entitled, "Novel Carbonaceous Material and Process for Producing a High BTU Gas from this Material," describes these processes fully. By this reference, we incorporate into this specification the entire disclosure of that specification.

Because this carbon deposition reaction takes place in a chemically reducing environment, rich in carbon monoxide and hydrogen, the carbonaceous material itself is produced in a reduced form. The iron in this reduced carbonaceous material is dispersed in, intimately associated with and at least partially bonded to the carbon in the material. X-ray analysis of this material shows diffraction patterns for $\alpha$-iron (2.03 dA), $Fe_3C$ (2.08 dA), or both, but not for such sulfided forms of iron as FeS (2.67 dA).

Sulfiding the reduced iron in these carbonaceous materials produces a new sulfided carbonaceous material with the iron dispersed in, intimately associated with and at least partially bonded to the carbon in the sulfided material. This sulfided material is surprisingly effective in reinforcing sulfur-curable, rubbery polymers. Such rubbery polymers include at least about two mole percent of residual unsaturation.

Sulfiding the iron in our carbonaceous materials can be effected in several ways. Preferably, the reduced iron-containing carbonaceous material is placed in a sealed vessel from which air and all other oxygen-containing gases are removed. Thereafter, the reduced iron-containing carbonaceous material is treated with hydrogen sulfide gas at a pressure in the range of about one to about 400 psig and at a temperature in the range of about 100° F. to about 400° F. for a time in the range of about one to about 16 hours. After cooling and venting the vessel, the sulfided carbon is removed and is ready for use in reinforcing rubbery polymers. X-ray diffraction shows that the reduced iron in the material is converted to FeS.

When X-ray diffraction shows that the reduced iron in the material has been converted to iron sulfide, the carbonaceous materials can be dried or otherwise treated for incorporation into rubber compositions, as described hereinafter. We can also convert the sulfided carbonaceous materials to agglomerates, called pellets in the carbon black industry.

To pelletize our materials, we mix them with water in about a 1:1 weight ratio, and roll this mixture in a rotating cylinder, rotating tilting dish, pin mill or pug mill for a time in the range of about 10 minutes to about 60 minutes, or until pellets of desired sizes form. Desirable pellet sizes are in the range of about 8 mesh to about 35 mesh. After forming these pellets, we dry them at a temperature in the range of about 80° C. to about 200° C. for a time in the range of about 0.1 to about two hours. Prepared in this manner, the carbonaceous materials contain sulfided iron, substantially all of which is FeS. The carbonaceous materials may also contain some oxidized iron if the pelletizing or drying is effected at sufficiently high temperatures.

Our new sulfided carbonaceous materials provide unexpectedly good reinforcement for vulcanized and vulcanizable diene rubber compositions, including, but not limited to, those made from styrene-butadiene rubber (SBR), polyisoprene rubber, natural rubber (NR), polybutadiene rubber (BR), Guayule and blends thereof. In such compositions, our new carbonaceous materials can constitute an amount in the range of about 5% to about 60% by weight.

We can incorporate our new carbonaceous materials in such diene-containing rubbery polymers by conventional techniques. Such techniques include Banbury mixing, two-roll mill mixing, solvent or latex master batching, or dry master batching. Our new rubber compositions may, but need not always include compounding oils. Such oils can constitute an amount up to about 25% of these compositions.

Carbon black fillers are commonly added to rubber compositions to increase their modulus, tensile strength and hardness upon vulcanization. ASTM Tests D412 and D2240 show that conventional carbon blacks, such as semi-reinforcing furnace (SRF) of Type ASTM N-762, perform such functions. Carbon blacks also permit rubber compositions containing them to flow for a time when the compositions are heated to vulcanization temperatures. Flow times and vulcanization properties are often measured with an oscillating disc rheometer (ODR) of the kind available from the Monsanto Company. When an unvulcanized, vulcanizable rubber composition is heated to vulcanization temperature in the ODR according to the procedure outlined in ASTM Test D1646, which calls for monitoring the torque required to turn the disc in a 3° arc while in contact with the vulcanizing ruber composition, the device produces a curve which traces the increasing torque that the disc encounters from the rubber as vulcanization progresses. The time for torque to increase five units, denoted $T_5$, is called the scorch period. This scorch period is designated as the point at which vulcanization begins. The time required for the vulcanizing rubber composition in the rheometer to reach about 90% of its optimum cure, denoted $T_{90}$, is designated the optimum cure. Maximum viscosity of the vulcanized rubber composition is directly related to its modulus and is denoted $\tau_{max}$.

Our new sulfided carbonaceous materials increase modulus, tensile strength and hardness of vulcanized diene-containing rubbery polymers reinforced with them to essentially the same extent as semi-reinforced furnace carbon black does. However, our carbonaceous materials produce a far shorter scorch period in diene-containing rubbery polymers reinforced with them than SRF does in the same rubbery polymers compounded the same way. Sulfiding the iron in these carbonaceous materials lengthens the scorch period for diene-containing rubbery polymers containing them. Our sulfided carbonaceous materials are more highly reinforcing than the non-sulfided form of these same materials.

The following example illustrates the preparation and properties of our new carbonaceous material, a method for incorporating such materials in diene-containing rubbery polymers, and the effects on the properties of vulcanizable and vulcanized rubber compositions reinforced with them.

EXAMPLE 1

Following the methods disclosed in U.S. patent application Ser. No. 99,789, indentified above more fully, we prepared carbonaceous materials comprising about 95% carbon, about 3.4% reduced iron in iron carbide form, and about 0.6% hydrogen.

We placed this reduced iron-containing carbonaceous material in a sealable vessel, and purged air and all other gases from the vessel with argon. Thereafter, we heated the vessel to 300° F., and pressurized the vessel with 130 psig of hydrogen sulfide for eight hours. We then cooled and vented the vessel and removed all the carbon therefrom.

X-ray diffraction scans of the sulfided carbonaceous materials showed substantially all the reduced iron was converted to FeS.

We then prepared two vulcanizable SBR-based samples, one comprising 50 parts by weight of the unsulfided carbonaceous materials (sample 1), the other, 50 parts by weight of the sulfided carbonaceous materials prepared as described above (sample 2).

We prepared both samples in a Banbury mixer operated at 77 revolutions per minute over a seven-minute time period, using water coolant on both the rotor and shell of the mixer. The mixing regime was as follows for both samples. At zero time, we placed the SBR polymer in the Banbury mixer. At 0.5 minutes, we added all other ingredients except for the carbonaceous materials. At one minute, we added half the carbonaceous materials, and at two minutes, we added the other half of the carbonaceous materials. At five minutes, we swept the mixer for undispersed material. At seven minutes, we removed the samples from the Banbury mixer. Curative chemicals were added on a two-roll mill.

We cured one portion of each sample in an hydraulic press for 50 minutes at 293° F., and tested these samples for tensile strength, elongation at break, modulus at 100% elongation and for tear strength. The data obtained appear in Table I below.

We cured a second portion of each sample in an oscillating disc rheometer at 320° F., operating to the disc over a 3° arc. The data obtained, including the scorch period, the optimum cure time, and the minimum and maximum torque observed are set forth in Table I below. Also in Table I is the area under the stress/strain curve, which is the area under the curve relating elongation at break to tensile strength at break.

As the data in Table I show, rubbery polymers such as SBR that are reinforced with the sulfided carbonaceous materials of our invention have higher cross link density, higher tensile strength, and a longer scorch period than the same polymers reinforced with the non-sulfided carbonaceous material.

TABLE I

| | 1 | 2 |
|---|---|---|
| Component | | |
| SBR 1500 | 100 | 100 |
| Unsulfided control carbonaceous materials | 50 | — |
| Sulfided carbonaceous materials | — | 50 |
| Zinc oxide | 5 | 5 |
| Stearic acid | 1 | 1 |
| Sulfur | 0.9 | 0.9 |
| Santocure NS[1] | 1 | 1 |
| Santogard PVI[2] | 0.4 | 0.4 |
| | 158.3 | 158.3 |
| Properties | | |
| Modulus at 100% elongation, psi[3] | 220 | 316 |
| Tensile strength at break, psi[3] | 1,478 | 1,924 |
| Elongation at break, percent[3] | 475 | 390 |
| Shore A hardness[4] | 55 | 62 |
| $T_5$, minutes[5] | 3 | 3.8 |
| $\tau$ minimum[5] | 17.5 | 19 |
| $T_{90}$, minutes[5] | 8.5 | 10.5 |
| $\tau$ max[5] | 50 | 71 |
| Area under stress/strain curve × $10^{-3}$ | 351 | 375 |

[1] N—t—butyl-2-benzothiazylsulfenamide.
[2] N—(cyclohexylthio)phthalimide.
[3] Results from procedures described in ASTM Test D412.
[4] Results from procedures described in ASTM Test D2240.
[5] Results from procedures described in ASTM Test D1646 run at 320° F. and a 3° arc.

What is claimed is:

1. Sulfided carbonaceous material comprising carbon in an amount of about 80% to about 99% by weight; sulfided iron dispersed in, intimately associated with and at least partially bonded to the carbon, in an amount of about 1% to about 15% by weight; and hydrogen in an amount of about 0.1% to about 1.5% by weight.

2. The sulfided carbonaceous material of claim 1 wherein carbon comprises an amount of about 90% to about 94% by weight; sulfided iron, an amount of about 3% to about 9% by weight; and hydrogen, an amount of about 0.5% to about 0.8% by weight.

3. A composition comprising a major amount of diene rubber and a minor amount of sulfided carbonaceous material comprising carbon in an amount of about 80% to about 99%; sulfided iron dispersed in, intimately associated with and at least partially bonded to the carbon, in an amount of about 1% to about 15% by weight; and hydrogen in an amount of about 0.1% to about 1.5% by weight.

4. The composition of claim 3 wherein said diene rubber is styrene-butadiene rubber, said styrene-butadiene rubber comprising an amount of about 90% to about 45% by weight of the composition and said sulfided carbonaceous material comprising an amount of about 5% to about 40% by weight of said composition.

5. The composition of claim 3 wherein said diene rubber is selected from the group consisting of styrene-butadiene rubber, natural rubber and mixtures thereof, said rubber comprising an amount of about 90% to about 45% by weight of said composition and said sulfided carbonaceous material comprising an amount of about 5% to about 40% by weight of said composition.

6. A composition comprising a major amount or diene rubber and a minor amount of sulfided carbonaceous material comprising carbon in an amount of about 90% to about 94% by weight; sulfided iron dispersed in, intimately associated with and at least partially bonded to the carbon, in an amount of about 3% to about 9%, and hydrogen in an amount of about 0.5% to about 0.8%.

7. The composition of claim 6 wherein said diene rubber is styrene-butadiene rubber, said styrene-butadiene rubber comprising an amount of about 90% to about 45% by weight of the composition and said sulfided carbonaceous material comprising an amount of about 5% to about 40% by weight of said composition.

8. The composition of claim 6 wherein said diene rubber is selected from the group consisting of styrene-butadiene rubber, natural rubber and mixtures thereof, said rubber comprising an amount of about 90% to about 45% by weight of said composition and said sulfided carbonaceous material comprising an amount of about 5% to about 40% by weight of said composition.

9. Pelletized carbonaceous material comprising carbon in an amount of about 80% to about 99%; sulfided iron dispersed in, intimately associated with and at least partially bonded to the carbon, in an amount of about 1% to about 15%; and hydrogen in an amount of about 0.1% to about 1.5% by weight.

10. The pelletized carbonaceous material of claim 9 wherein the pellets have a size in the range of about 8 mesh to about 35 mesh.

11. The pelletized carbonaceous material of claim 9 comprising carbon in an amount of about 80% to about 99%; sulfided iron in an amount of about 1% to about 15%; and hydrogen in an amount of about 0.1% to about 1.5% by weight.

* * * * *